US008857755B2

(12) United States Patent
Karim

(10) Patent No.: US 8,857,755 B2
(45) Date of Patent: Oct. 14, 2014

(54) VERTICAL/SHORT TAKE-OFF AND LANDING PASSENGER AIRCRAFT

(75) Inventor: Munawar Karim, Fairport, NY (US)

(73) Assignee: Utterfly Aircraft, LLC, Fairport, NY (US)

( * ) Notice: Subject to any disclaimer, the term of this patent is extended or adjusted under 35 U.S.C. 154(b) by 257 days.

(21) Appl. No.: 13/562,484

(22) Filed: Jul. 31, 2012

(65) Prior Publication Data

US 2014/0061368 A1  Mar. 6, 2014

(51) Int. Cl.
   *B64C 27/28*  (2006.01)
   *B64C 29/00*  (2006.01)

(52) U.S. Cl.
   CPC ............. *B64C 27/28* (2013.01); *B64C 29/0008* (2013.01)
   USPC ....................................................... 244/12.4

(58) Field of Classification Search
   CPC  B64C 39/04; B64C 29/0033; B64C 29/0008; B64C 27/28
   USPC ..................................... 244/12.4, 7 C, 7 R, 6
   See application file for complete search history.

(56) References Cited

U.S. PATENT DOCUMENTS 3,159,361 A    12/1964  Weiland
5,560,568 A *  10/1996  Schmittle ........................ 244/48
5,758,844 A *   6/1998  Cummings .................... 244/7 C
7,143,973 B2* 12/2006  Ballew ............................. 244/6
8,256,704 B2*  9/2012  Lundgren ...................... 244/7 C
2007/0158494 A1*  7/2007  Burrage ........................ 244/7 R
2009/0212166 A1*  8/2009  Garreau ........................ 244/7 R
2012/0318908 A1* 12/2012  Morris ............................. 244/6

FOREIGN PATENT DOCUMENTS

DE        4443731     6/1996
RU        2075425     3/1997
RU        2078715     5/1997

* cited by examiner

*Primary Examiner* — Isam Alsomiri
*Assistant Examiner* — Justin Benedik
(74) *Attorney, Agent, or Firm* — Tracy Jong Law Firm; Tracy P. Jong; Cheng Ning Jong

(57) ABSTRACT

The present aircraft comprises a pair of spaced apart and parallelly disposed fuselages, a pair of wings, each wing is attached to an outer portion to each fuselage, a pyramid structure adapted to connect the pair of fuselages and an articulated propulsion system having a thrust axis, wherein the articulated propulsion system is pivotably attached to the pyramid structure and configured for angle of rotation of from about 0 degrees corresponding to the thrust axis disposed substantially parallel but at an offset to a longitudinal axis of the aircraft to about 90 degrees corresponding to the thrust axis disposed substantially at right angle to the longitudinal axis. The thrust axis substantially intersects the center of gravity when the thrust axis is disposed substantially at right angle to the longitudinal axis and the thruster is capable of angle of rotation of about 0 degrees or 90 degrees during take-off or landing.

20 Claims, 7 Drawing Sheets

VERTICAL/SHORT TAKE-OFF AND LANDING PASSENGER AIRCRAFT

BACKGROUND OF THE INVENTION

1. The Field of the Invention

The present invention is directed generally to a Vertical/Short Take-Off and Landing (V/STOL) aircraft, and more particularly, to a twin-fuselage propeller equipped V/STOL aircraft capable of performing take-off and landing with its thrust vector vertically or horizontally disposed.

2. Background Art

V/STOL aircraft generally rely on rotating the thrust vector between horizontal and vertical directions to take advantage of limited space for take-off and landing while still realizing the economy of conventional forward flight for some segments of a flight. So-called tilt-rotor/tilt-propeller aircraft are capable of operating through a range of angles between horizontal and vertical where the direction of travel is determined by the angle of the thrust generated by the tilt-rotor or tilt-propeller. When flying in a conventional manner, lift is provided by wings. For hover or vertical translation, rotors are used to supply lift.

Stability is a pernicious problem in V/STOL aircraft. A few configurations have been tested such as Canadair CL-84 and Ling-Temco-Vought XC-142 (hereinafter CL-84 and XC-142). Rotors, which swivel, have been mounted on wing tips, such as in Bell Boeing V-22 (hereinafter V-22). These designs suffer from instability caused by thrust imbalances along the vertical axis, i.e., the aircraft's equilibrium is unstable. Attempts to alleviate instability have led to cumbersome, complex and expensive aircraft. Tilt-rotor aircraft are essentially a hybrid between conventional aircraft and helicopters. They are capable of rapid forward flight, as well as slower vertical translation. However, as they are sustained by lift from wings in forward flight, tilt-rotor aircraft fly much faster and more economically than helicopters.

German Pat. No. DE4,443,731 (hereinafter Conrado) discloses a V/STOL aircraft incorporating an engine having a drive unit that is an airscrew drive. The airscrew drive has two sets of coaxial counter-running cyclically and collectively adjustable rotary blades. Conrado differs from the present invention in two major respects. First, Conrado discloses an engine that is coupled to an inboard winglet and together they are configured to be tiltable as a unit. In certain flight segments, the winglet is configured to tilt until the propeller axis is vertical. For stability, the winglet must be designed to withstand the rigors of vertical-horizontal or horizontal-vertical flight transitions, and therefore requiring substantially large structure to support such winglet. Therefore downwash from rotor blades can be substantially blocked by the winglet. Secondly, Conrado's engines are placed between the two fuselages, resulting in the requirement of an unnecessarily large gap between the fuselages or a pair of propellers having unnecessarily small diameter due to the spatial limitation of the gap. It shall be apparent to those skilled in the art, the diameter of the propellers, especially those of shallow pitch (designed for vertical flight), must be configured sufficiently large for efficient propulsion. However, the gap is not to be configured so large as to significantly lower structural rigidity. Whereas for forward propulsion, the diameter of the propellers shall be smaller but with sharp pitch. These are contrary requirements. In Conrado, the smaller propeller diameter necessitated by the gap between the fuselages forces the use of a small propeller diameter, sacrificing lift efficiency, which must be compensated by an increase in power.

U.S. Pat. No. 5,758,844 to Cummings (hereinafter Cummings) discloses a vehicle including a fuselage, a plurality of lifting surfaces attached to the fuselage having control devices attached thereto and an articulated propulsion system attached to the fuselage. The propulsion system includes a duct assembly pivotably connected to the fuselage. The duct assembly includes a duct and a propeller assembly mounted within the duct. A motor assembly is connected to the propeller assembly. The duct assembly may be positioned in a substantially vertical position to provide sufficient direct vertical thrust for vertical take-off and landing and may be directed in other positions to provide a varying spectrum of take-off and landing configurations, as well as a substantially horizontal position for high speed horizontal flight. During horizontal flight, the wings provide the lift, which is more efficient than a propeller providing lift. Cummings takes advantage of a center line propulsion, so that there are no asymmetric propulsion loads, similar to the concept of the present invention. Cummings differs in at least two significant ways however. The propulsion system of the present aircraft includes a twin counter-rotating propellers without a shroud while Cummings' propulsion system is a ducted fan. As it shall be appreciated by those skilled in the art, ducted fans are known to be inferior to propellers in the following ways: (a) Ducted fans are less efficient than a propeller at cruise (at lower thrust level); (b) Good efficiency requires very small clearances between the blade tips and the duct, where such clearances are difficult to maintain; (c) Ducted fans require high RPM and minimal vibration; (d) Complex duct design, and weight increase even if constructed from advanced composites; (e) At an angle of incidence greater than about 30 degrees, parts of the duct would be stalled and producing drag; and (f) Articulated wings complicate the control of vertical-forward or forward-vertical flight transitions. As ducted fans are generally smaller in diameter than propellers to create equivalent amounts of lift, the use of a pyramid structure to elevate the propulsion system is not contemplated in Cummings. Further, no articulated wings or winglets are utilized in the present invention, thereby reducing the complexity of the present aircraft and allowing the use of more than one wingtip-to-wingtip spar for added structural rigidity.

U.S. Pat. No. 3,159,361 to Weiland discloses an aircraft having four articulated engines distributed on four locations of the aircraft. In Weiland, there is neither consideration in making the propellers as large as possible with respect to the fuselages, nor consideration of consolidating the multiple thrust vectors into a single thrust vector.

Russian Pat. Nos. RU2078715C1 and RU2075425C1 to Arabi Mukhamed Yu (hereinafter Yu) disclose two versions of twin-fuselage passenger aircraft. However, Yu does not contemplate vertical flight.

SUMMARY OF THE INVENTION

The present invention is a Vertical/Short Take-Off and Landing (V/STOL) aircraft capable of providing high speed forward flight. In its broad aspects, the present aircraft comprises:

(a) a pair of spaced apart and parallelly disposed fuselages to form a gap, wherein the pair of fuselages comprises a longitudinal axis;

(b) a pair of wings, each wing is attached to an outboard side of each fuselage;

(c) a pyramid structure adapted to connect the pair of fuselages; and (d) an articulated propulsion system having a thrust axis, wherein the articulated propulsion system is pivotably attached to the pyramid structure and configured for angle of rotation of from about 0 degrees corresponding to the thrust axis disposed substantially parallel but at an offset to the longitudinal axis to about 90 degrees corresponding to the thrust axis disposed substantially at right angle to the longitudinal axis, wherein the thrust axis substantially intersects the center of gravity of the aircraft when the thrust axis is disposed substantially at right angle to the longitudinal axis and the propulsion system is capable of an angle of rotation ranging from about 0 degrees to 90 degrees during take-off or landing.

In one embodiment, the propulsion system is a counter-rotating co-axial propeller system. In one embodiment, the counter-rotating co-axial propeller system comprises a means for cyclical control.

In one embodiment, the ratio of the offset to the gap ranges from about ⅓ to about ⅚.

Each fuselage comprises at least one access door on an outboard side to allow entry to and egress from the fuselage without exposure to the propulsion system.

It is a primary object of the present invention to provide an aircraft capable of take-off and landing in confined spaces.

It is another object of the present invention to provide a V/STOL aircraft having inherent stability during flight and does not require complex flight control and failure recovery.

It is yet another object of the present invention to provide a propeller system that is as large as possible for efficient forward as well as vertical flights.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

In this respect, before explaining at least one embodiment of the invention in detail, it is to be understood that the invention is not limited in its application to the details of construction and the arrangements of the components set forth in the following description or illustrated in the drawings. The present invention is capable of other embodiments and of being practiced and carried out in various ways. Also it is to be understood that the phraseology and terminology employed herein are for the purpose of description and should not be regarded as limiting.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

Figure 1:
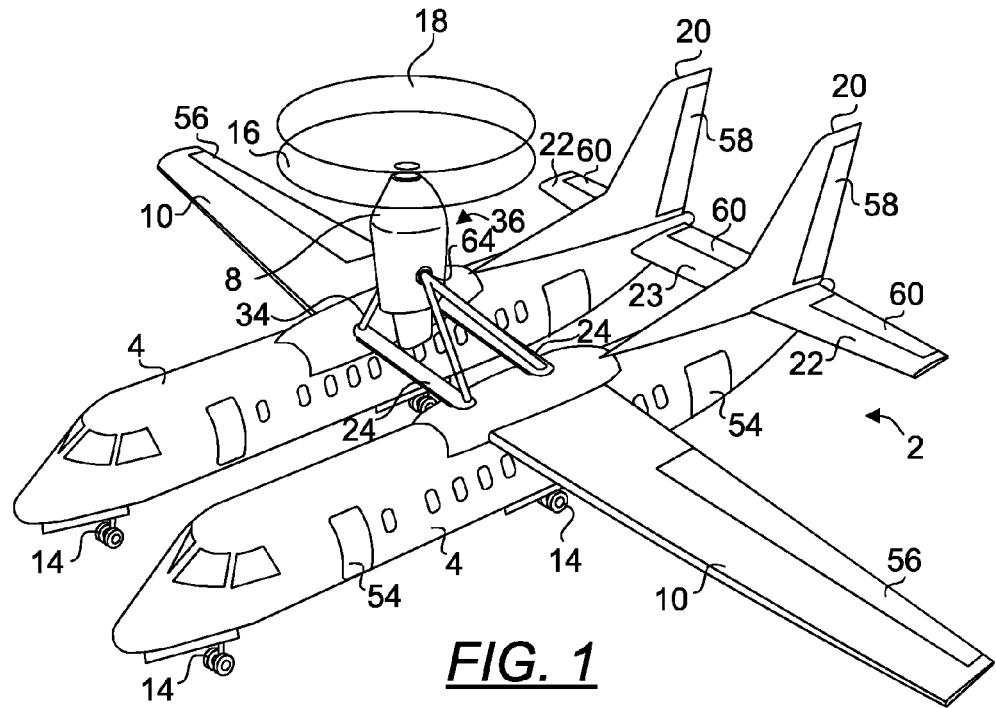
FIGS. 1 and 2 are top front and top rear perspective views, respectively, of an embodiment of the present aircraft, depicting the engine pod disposed in an orientation for vertical flight.

2—V/STOL aircraft
4—fuselage
6—pyramid structure
8—engine pod
10—wing
12—vertical axis
14—landing gear
16—propeller
18—propeller
20—vertical stabilizer
22—horizontal stabilizer
23—central horizontal stabilizer
24—spar
26—ground
28—thrust
30—angle of rotation of engine pod with respect to longitudinal axis
32—thrust axis
34—strut
36—propulsion system
38—longitudinal axis
40—horizontal axis
42—center of gravity
44—width of wing
46—position of horizontal axis relative to the leading edge of wing at base of wing
48—offset between thrust axis and longitudinal axis in forward flight 50—leading edge of wing
52—gap between two fuselages
54—access door
56—aileron
58—rudder
60—elevator
62—swivel axis
64—pivot point
66—internally disposed strut connecting the spars
68—airbag
70—protective skin structure

PARTICULAR ADVANTAGES OF THE INVENTION

The Applicant discovered that by raising the engine pod above the fuselages, larger diameter propellers can be used in the gap between the fuselages, such that propeller diameter and pitch for both vertical lift and forward propulsion can be optimized. During vertical flight, the fuselages do not interfere with the downward airflow. As airflow progresses downwardly uninterruptedly between the two fuselages, it simply narrows because of the pressure drop due to increases in velocity.

The engine pod and propellers of the present aircraft are supported by a pyramid structure. Conrado fails to contemplate such design and simply disposes the propellers centrally between in the gap between two fuselages. By raising the engine pod to a higher position, two continuous spars are configured to run from one wingtip to another, making the airframe rigid. In Conrado however, such configuration is impossible as an articulated winglet is disposed between the two fuselages, thereby allowing at most one spar about which the winglet is configured to rotate. Bearing load issues raised in Conrado are irrelevant in the present aircraft as the spars of the present aircraft are not attached to an articulated engine pod. The present pyramid structure provides torsional rigidity between the two fuselages.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

The term "horizontal axis" 40 is a transversely disposed line located at about a third 46 of the wing width 44 from the leading edge 50 of the base of a wing 10. The horizontal axis represents the region where the aircraft experiences maximum wing lift. This region may also be termed center of lift.

The term "longitudinal axis" 38 is a centrally disposed axis aligned in the lengthwise direction of the aircraft which intersects and disposed perpendicularly relative to the horizontal axis 40.

The term "thrust axis" is defined as an axis which represents the direction in which the thrust vector of the propulsion system acts. In the present aircraft, as there is only one propulsion system, there is only a single thrust axis.

Ideally and in powered condition, the thrust axis is preferably aligned to penetrate the intersection of the horizontal and longitudinal axes 40, 38 and the center of gravity 42 should be located vertically below this intersection such that stability is achieved about the vertical, horizontal and longitudinal axes. As the center of gravity of the engine pod 8-propellers 16, 18 assembly is disposed centrally between the two engine pod attachment points of the pyramid structure, the stability of the present aircraft is maintained by constraining the rotation of the thrust axis on the plane defined by the vertical 12 and longitudinal 38 axes. In the present embodiment, the center of gravity is disposed slightly forward with respect to the intersection of the longitudinal axis 38 and horizontal axis 40, i.e., the aircraft is nose-heavy and capable of gliding in the event of a total power failure.

The term "roll axis" is an axis which penetrates the center of gravity and disposed parallel to the longitudinal axis.

The term "swivel axis" is an axis disposed perpendicularly to the longitudinal axis and an axis about which the engine pod is configured to rotate.

Figure 2:
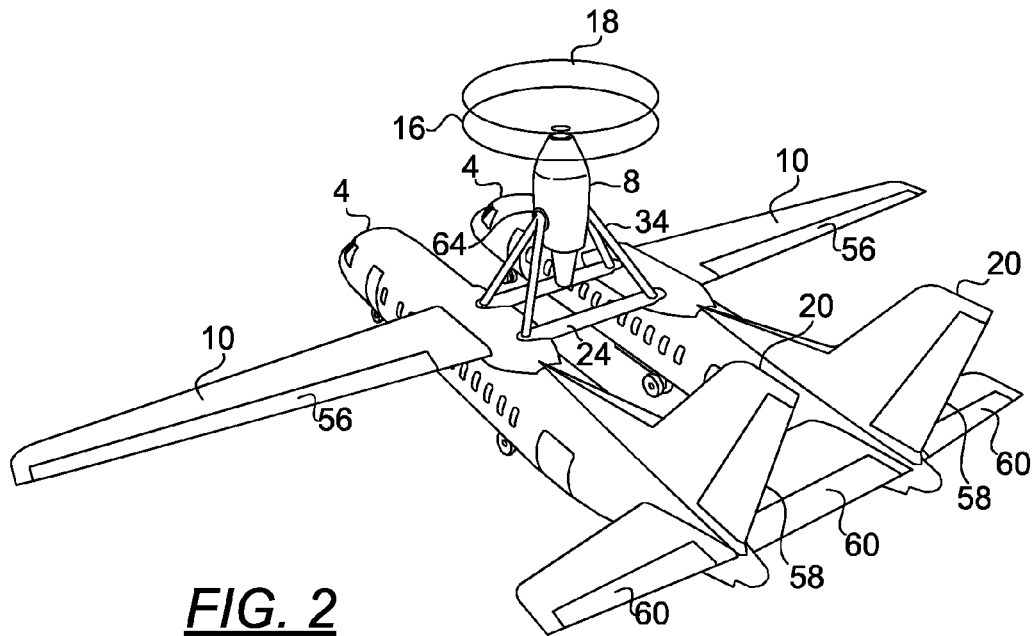
Figure 3:
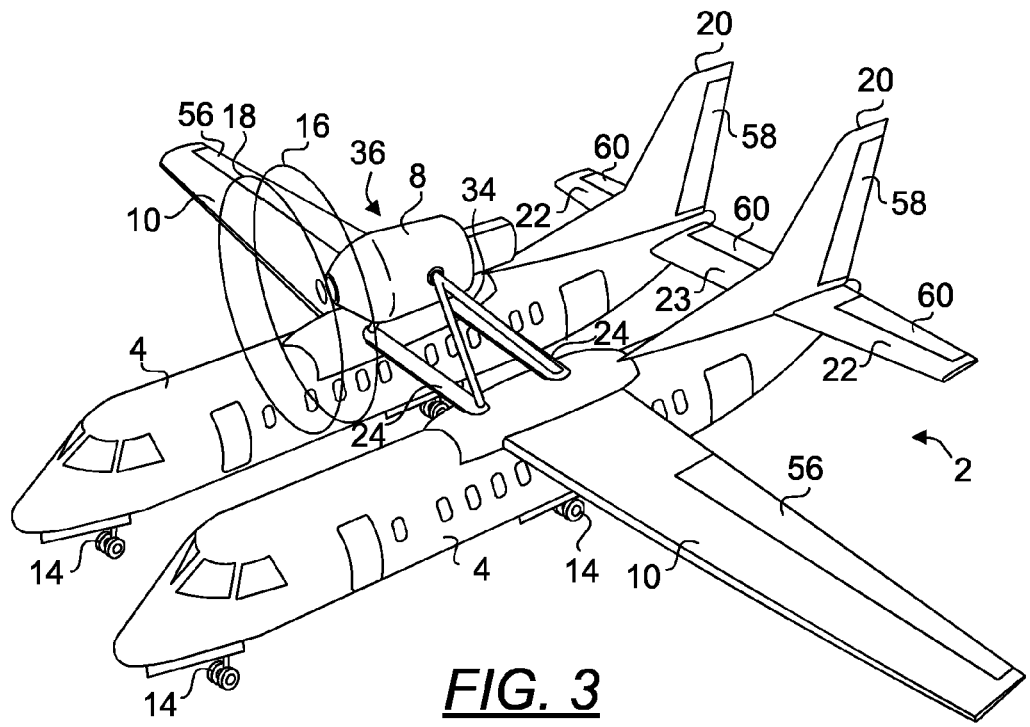
FIGS. 3 and 4 are top front and top rear perspective views, respectively, of an embodiment of the present aircraft, depicting the engine pod disposed in an orientation for forward flight.
Figure 4:
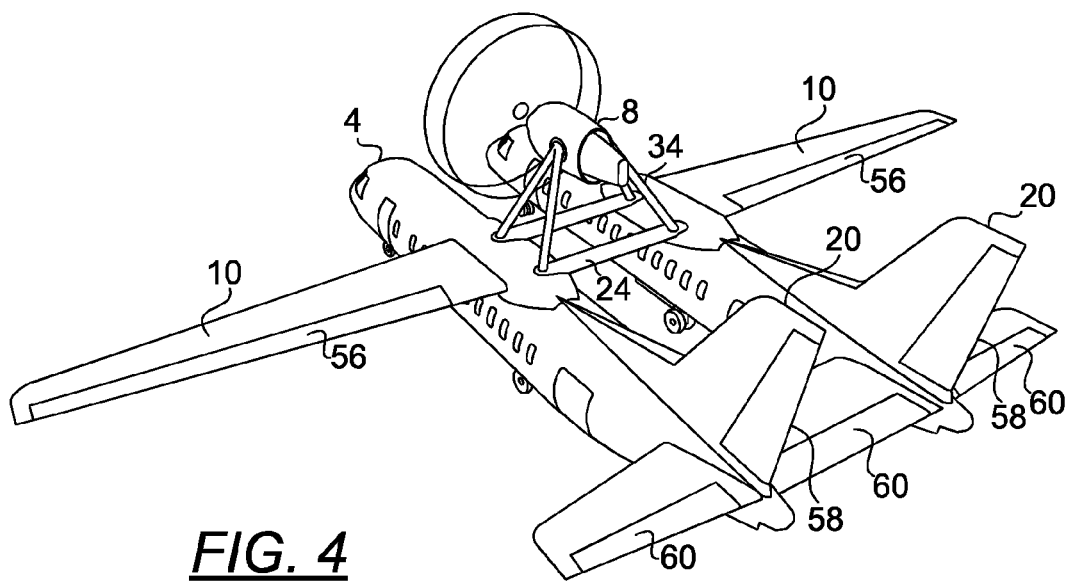

FIGS. 1 and 2 are top front and top rear perspective views, respectively, of an embodiment of the present aircraft, depicting the engine pod disposed in an orientation for vertical flight. FIGS. 3 and 4 are top front and top rear perspective views, respectively, of an embodiment of the present aircraft, depicting the engine pod disposed in an orientation for forward flight. The aircraft 2 comprises a pair of fuselages 4, a pair of wings 10, a pyramid structure 6 and an articulated propulsion system 36. The fuselages 4 are spaced apart and parallelly disposed to form a gap within which the propulsion system 36 is accommodated. Apart from facilitating V/STOL flying modes, twin fuselages provide added passenger and cargo capacity in a compact space. Each fuselage 4 is generally elongated and cylindrical with a pilot cockpit disposed in the front and passenger seating located along the length of the fuselage 4. It may be formed of a composite shell, aluminum and other suitable light weight aircraft structural material. It generally contains flight control system actuators, avionics and electronics and subsystems such as cooling systems, hydraulics, and electrical systems. A wing 10 is attached to the outboard side of each fuselage 4 about centrally in the lengthwise direction of the fuselage 4 and includes at least one aileron 56, by methods well understood by those skilled in the art. Each fuselage 4 further includes a vertical stabilizer 20, a horizontal stabilizer 22 and a central horizontal stabilizer 23. All of these components and the wings 10 are formed of similar suitable aircraft structures as each fuselage 4. Similar to a conventional aircraft, each vertical stabilizer 20 extends upwardly from a rear portion of a fuselage 4 and includes a rudder 58 which serves as a directional control surface. Each horizontal stabilizer 22 is attached to the outboard side of a rear portion of a fuselage 4 and includes an elevator 60. The central horizontal stabilizer 23 connects a rear portion of a fuselage 4 to a rear portion of another fuselage 4 where its surface substantially aligns with the horizontal stabilizers 22 and includes an elevator 60. In addition to providing a lifting surface for the aircraft, the central horizontal stabilizer 23 provides structural rigidity to the aircraft by structurally connecting the two fuselages 4 at a rear portion of each fuselage 4 in addition to the two spars 24 connecting the two fuselages at a forward location.

The present aircraft differs from CL-84, XC-142 and V-22 in important ways. One major difference lies in the single thrust axis as in the case of the present aircraft as compared to twin or multiple thrust axes of these prior art aircraft. The articulated propulsion system includes an engine pod 8 connected to a pair of propellers 16, 18. Each propeller is represented as a disk in the present drawing figures as propellers are well known to those skilled in the art and requires no further details. The number of blades required on each propeller is also well known to those skilled in the art. The thrust axis of the present aircraft is located just forward of the present aircraft's intersection of the longitudinal and horizontal axes while those on CL-84, XC-142 and V-22 are distributed among the wings or on wing tips. The engine pod 8 typically contains two engines where only one engine is all that is required to maintain flight as each engine is configured to power both propellers 16, 18 independently. The two spaced apart fuselages are designed not only for passengers and cargo, but also to provide a gap to accommodate the single thrust axis between the fuselages 4, rather than at the extremities. The thrust axis of the present aircraft is thus aligned with the longitudinal axis of the aircraft, thereby eliminating the difficulty in synchronizing multiple thrust vectors to prevent inadvertent roll about the longitudinal axis. As a result, unlike CL-84, XC-142 and V-22, the present aircraft is intrinsically stable in all flying modes. When their thrust vectors are disposed vertically, aircraft such as CL-84, XC-142 and V-22 are intrinsically unstable along the roll axis. Due to the large distantly distributed weights or inertia of the engines and propellers away from their center of gravity, small imbalances in the aircraft are magnified and impossible to be corrected rapidly. This design weakness has been partially cured in the V-22 by cross-connecting the two wingtip disposed engines and propellers by a single shaft at the expense of an increase in complexity, weight and cost. In contrast, the present aircraft is intrinsically stable where only one thrust vector is used to support and propel the present aircraft. The present aircraft is preferably equipped with two engines such that in case one engine fails, a second engine may be used to provide the only source of lift, albeit with limited capability, as each engine is configured to power both propellers 16, 18 independently. In case of total power loss, the present aircraft may glide to a landing if the propellers are positioned forward flight. If the propellers are positioned for vertical flight, upon total power loss, blade pitch of the propellers 16, 18 is minimized to anticipate the use of autogyration to cushion landing.

The present aircraft is capable of both forward and vertical flights. When the engine pod 8 and propellers 16, 18 assembly is disposed vertically, hovering and vertical translation are possible. After a vertical or short take-off, the assembly is rotated forward in a controlled manner, gradually segueing from vertical to forward flight. Upon arriving at a destination, the present aircraft can either land on a conventional runway or an abbreviated landing strip, or, if necessary, vertically on an unprepared surface. The take-off weight of an aircraft is limited by the total weight including the aircraft and payload at vertical take-off. As the present aircraft is capable of conventional take-off, the maximum payload of the present aircraft exceeds that of a V/STOL incapable of conventional take-off such as V-22. In V-22, by contrast, the propeller diameter is too large for horizontal orientation while on the ground and therefore incapable of conventional take-off and landing. Such aircraft can at best perform a short take-off which still limits its take-off weight to a level lower than that of an aircraft capable of conventional take-off.

Each fuselage includes at least one passenger access door 54 on an outboard side, facilitating entry and egress of personnel or passenger on a side of the fuselage that is free from hazards associated with an active propulsion system.

The present aircraft is equipped with conventional, retractable landing gear to facilitate take-off and landing. Preferably, a set of landing gear 14 is disposed under the nose of each fuselage 4 while another set is disposed under the fuselage aft of the center of gravity in the lengthwise direction of the fuselage 4.

Figure 13:
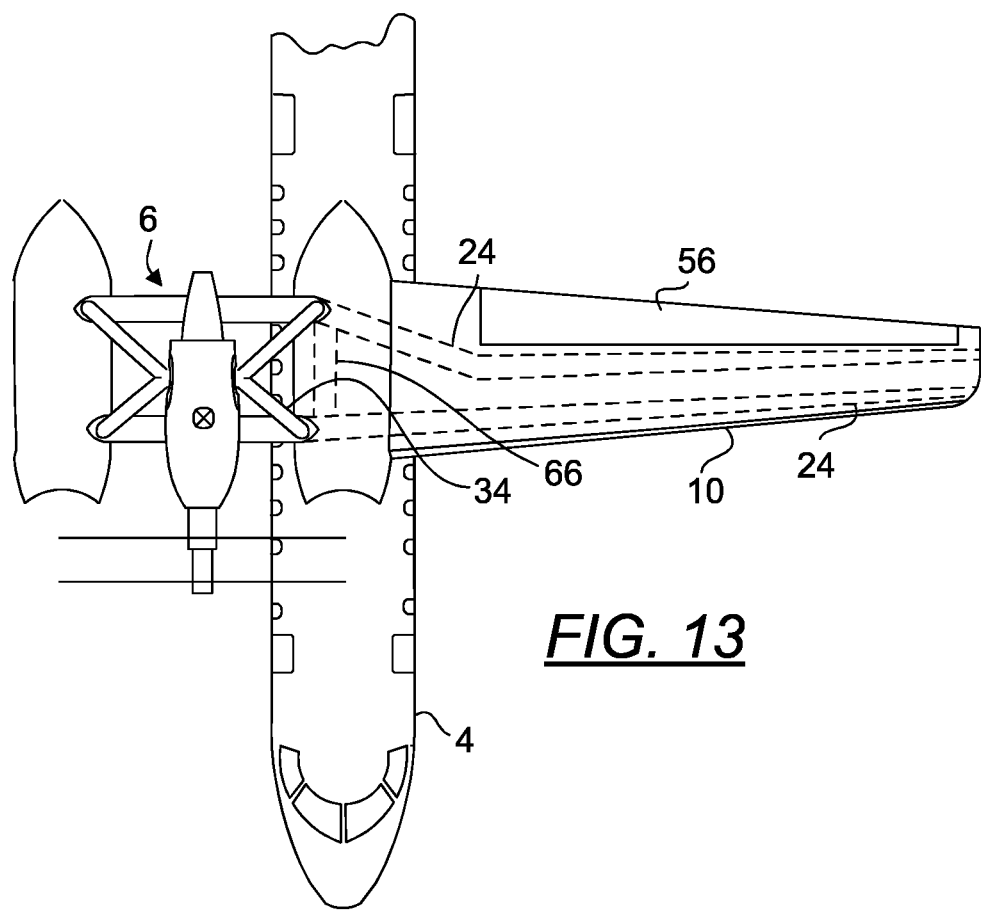
FIG. 13 is a partial transparent top orthogonal view of an embodiment of the present aircraft, depicting a typical spar configuration within a wing of the present aircraft.

As the engine pod 8 is pivotably attached to a pyramid structure 6, the engine pod 8 and propellers 16, 18 assembly is raised to a level capable of clearing both the fuselages 4 and the ground 26. In V-22, by contrast, the propellers must be rotated such that the thrust axes are not disposed in parallel with the forward travel direction of the aircraft during take-off and landing to avoid ground impact of the wingtip mounted propellers. The pyramid structure 6 is essentially composed of four struts 34 arranged in a rectangular manner, each extending upwardly toward one another and culminating at two pivot points 64, one on each lateral side of the aircraft. Such arrangement aids in resisting potential torsional displacement between the fuselages 4. The struts 34 typically contain fuel conductors to enable supply of fuel to the engines in the engine pod 8. The engine pod 8 is configured to rotate from an angle 30 of about 0 to 90 degrees with respect to the longitudinal axis 38. For structural rigidity, each strut 34 is fixedly attached to a spar 24 and the spars 24 are fixedly attached to one another as shown in FIG. 13. The spars 24 typically contain fuel conductors to enable shifting of fuel for redistribution of weight on each lateral side of the pyramid structure. Each spar 24 or strut 34 is typically constructed from suitable aircraft structural material. An angle 30 of rotation of 0 degrees corresponds to the thrust axis being disposed substantially parallel to the longitudinal axis 38 while angle 30 of rotation of 90 degrees corresponds to the thrust axis being disposed substantially perpendicularly to the longitudinal axis 38. The engine pod 8-propellers 16, 18 assembly is pivotably mounted as a unit at the pivot points 64 and configured to swivel about the swivel axis 62 based on flight requirements. Suitable bearings are disposed at the pivot points 64 to support and facilitate the articulated propulsion system while at least one suitable hydraulic actuator is used to articulate the propulsion system between the horizontal configuration, i.e., 0 degrees with respect to the longitudinal axis 38 and the vertical configuration, i.e., 90 degrees with respect to the longitudinal axis 38. Such pivotable actuation means are well known to those skilled in art and are in aircraft such as CL-84, XC-142 and V-22. The center of gravity of the engine pod 8-propellers 16, 18 assembly is disposed centrally with respect the pivot points 64 and along the swivel axis 62. As such, the center of gravity 42 of the aircraft as a whole does not change as the assembly swivels about the swivel axis 62.

In one embodiment, the propulsion system is a counter-rotating co-axial twin propeller system. As a pair of propellers 16, 18 is used instead of a single propeller, smaller diameter propellers can be used to generate the same amount of thrust as a single larger diameter propeller. As a result, the fuselages can be brought closer for added structural rigidity. This feature places Applicant's disclosure in direct contrast to Conrado's thrust axis which is disposed essentially on a shortest line connecting the two fuselages. By using a pyramid structure, two continuous spars 24 are configured to run from one wingtip to another wingtip, resulting in a rigid airframe. In contrast to Conrado, bearing load issues of the wingtip as raised in Conrado are non-existent in the present aircraft as the spars 24 are not connected directly to the articulated engine pod 8. In addition, by using a pair of propellers, the wingspan of the wings 10 can be reduced as increased thrust causes higher aircraft cruising speed that generates larger lift, resulting in a more compact aircraft. The structural and hence as a result, weight requirement to support more expansively spaced fuselages is removed. The propellers 16, 18 are configured to counter rotate and therefore required to possess opposingly disposed pitch to essentially create zero net torque about the thrust axis. The engines are also arranged in such a manner that they generate net angular momentum. As the engines and propellers produce zero net angular momentum, gyroscopic effects of the engine-propellers assembly are nulled when the engines operate. In one example of a 40-passenger aircraft, the diameter of each propeller is about 12 ft and the gap between the fuselages is about 10 ft. In one embodiment where precise positioning of the aircraft is desired, the counter-rotating co-axial propeller system comprises a means for cyclical control, similar to a helicopter rotor system. In such an arrangement, the propellers are mounted on rotors similar to those available on helicopters. Reference is made to U.S. Pat. No. 7,083,142 to Scott for a coaxial counter-rotating rotor system having cyclical control.

Figure 5:
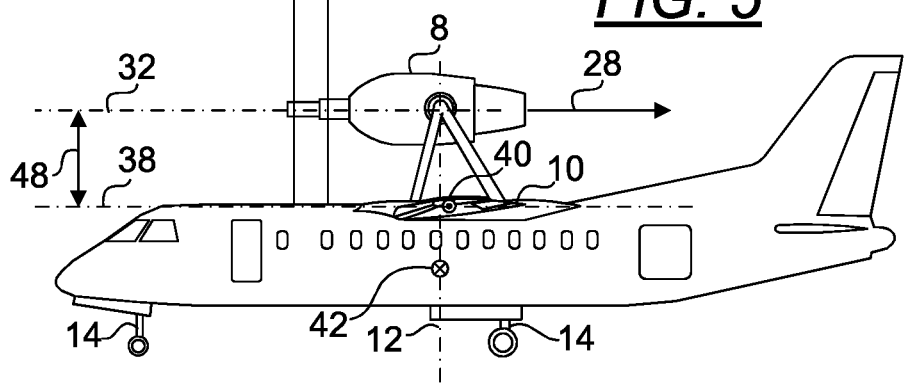
FIG. 5 is a side orthogonal view of an embodiment of the present aircraft, depicting the engine pod disposed in an orientation for conventional take-off or landing.

FIG. 5 is a side orthogonal view of an embodiment of the present aircraft, depicting the engine pod disposed in an orientation for conventional take-off or landing. In forward flight, the thrust axis is disposed in a parallel manner but at an offset 48 above the longitudinal axis. In contrast, Conrado's thrust axis is substantially co-axial with the longitudinal axis, thereby limiting the size of propellers that can be used. By disposing the thrust axis at an offset 48, larger diameter propellers can be utilized. In addition, the propellers can be disposed in forward flight configuration during take-off and landing. In a preferred embodiment, the ratio of the offset 48 to the gap 52 between two fuselages ranges from about 2 ft/6 ft or ⅓ to about 5 ft/6 ft or ⅚. It shall also be noted that in this propeller orientation, the swivel axis 62 is disposed vertically over the center of gravity 42 of the aircraft. The horizontal axis 40 is disposed slightly aft of the center of gravity 42 of the aircraft. As the horizontal axis 40 represents the region at which maximum lift is exerted, a total engine failure condition will cause the aircraft to be nose heavy as the center of gravity 42 is disposed slightly forward in the longitudinal direction.

Figure 6:
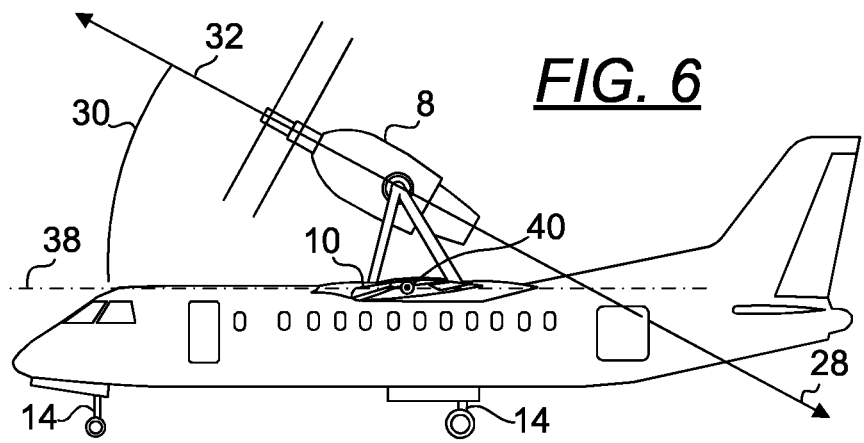
FIG. 6 is a side orthogonal view of an embodiment of the present aircraft, depicting the engine pod disposed in an orientation for short take-off or landing.

FIG. 6 is a side orthogonal view of an embodiment of the present aircraft, depicting the engine pod disposed in an orientation for short take-off or landing. The thrust 28 generated by the combination is directed partially downwardly and partially rearwardly at an angle 30 of rotation with respect to the longitudinal axis 38, thereby creating a force that propels or supports the aircraft forwardly and upwardly. As a result, take-off and landing distances can be minimized as the aircraft does not rely solely on sufficient forward speed to generate lift with wings.

Figure 7:
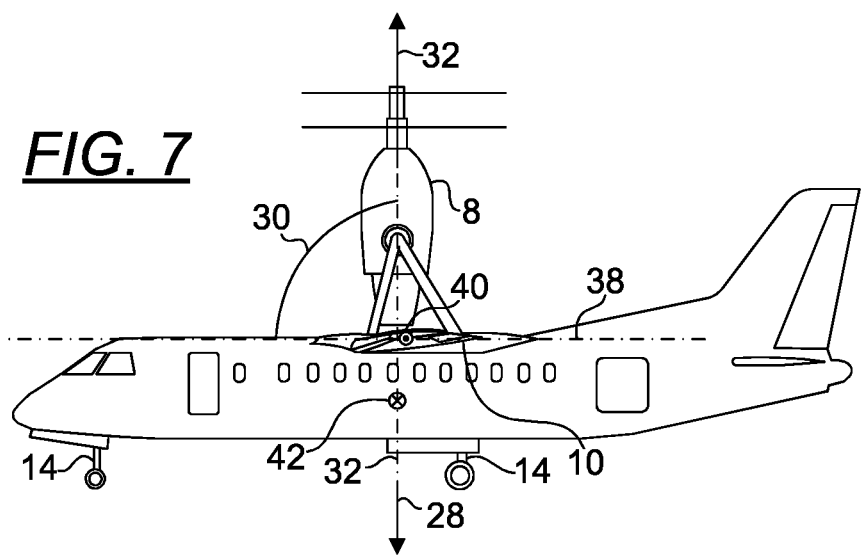
FIG. 7 is a side orthogonal view of an embodiment of the present aircraft, depicting the engine pod disposed in an orientation for vertical take-off or landing.

FIG. 7 is a side orthogonal view of an embodiment of the present aircraft, depicting the engine pod disposed in an orientation for vertical take-off or landing. In this configuration, the thrust 28 is directed downwardly in its entirety as the angle 30 of rotation is substantially at right angle to the longitudinal axis 38. It shall be noted that the thrust axis 32 now penetrates the center of gravity 42, resulting in little lateral force being required to balance the aircraft in hover position or moving in the upwardly or downwardly direction.

Figure 8:
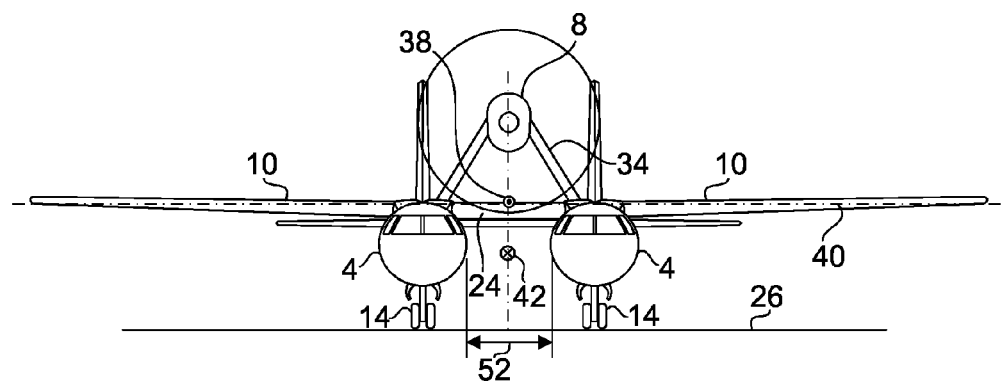
FIGS. 8 and 9 are front and top orthogonal views, respectively, of an embodiment of the present aircraft, depicting the engine pod disposed in an orientation for forward flight.
Figure 9:
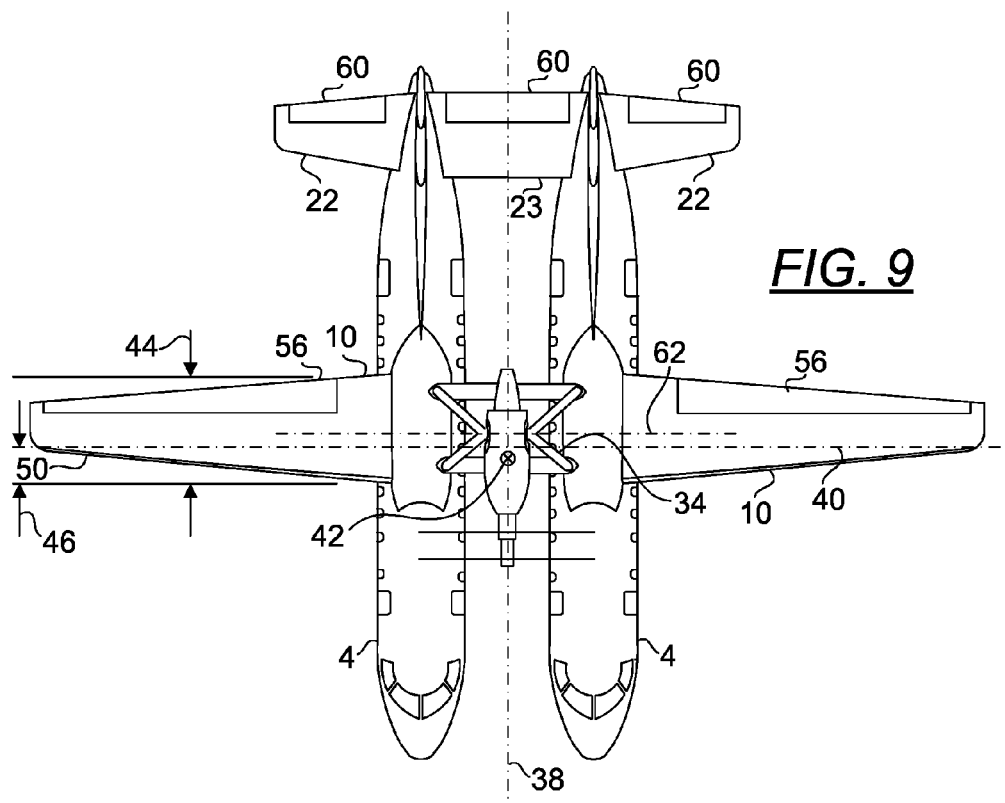

FIGS. 8 and 9 are front and top orthogonal views, respectively, of an embodiment of the present aircraft, depicting the engine pod disposed in an orientation for forward flight. It shall be noted that the engine pod 8 is symmetrically disposed about the center of gravity 42. Referring back to FIG. 8, as viewed from this angle, it is to be appreciated that the wide lateral stance encompassed by the two fuselages 4 eliminates the need to mount any landing gear under the wings 10, thereby simplifying the wing design and eliminating any additional structural stresses exerted on the wings that are associated with having any landing gear attached to the wings 10.

Figure 10:
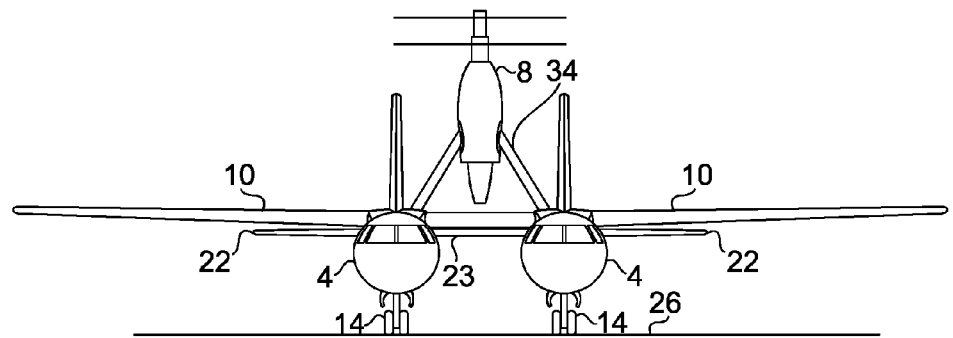
FIGS. 10 and 11 are front and top orthogonal views, respectively, of an embodiment of the present aircraft, depicting the engine pod disposed in an orientation for vertical take-off or landing.
Figure 11:
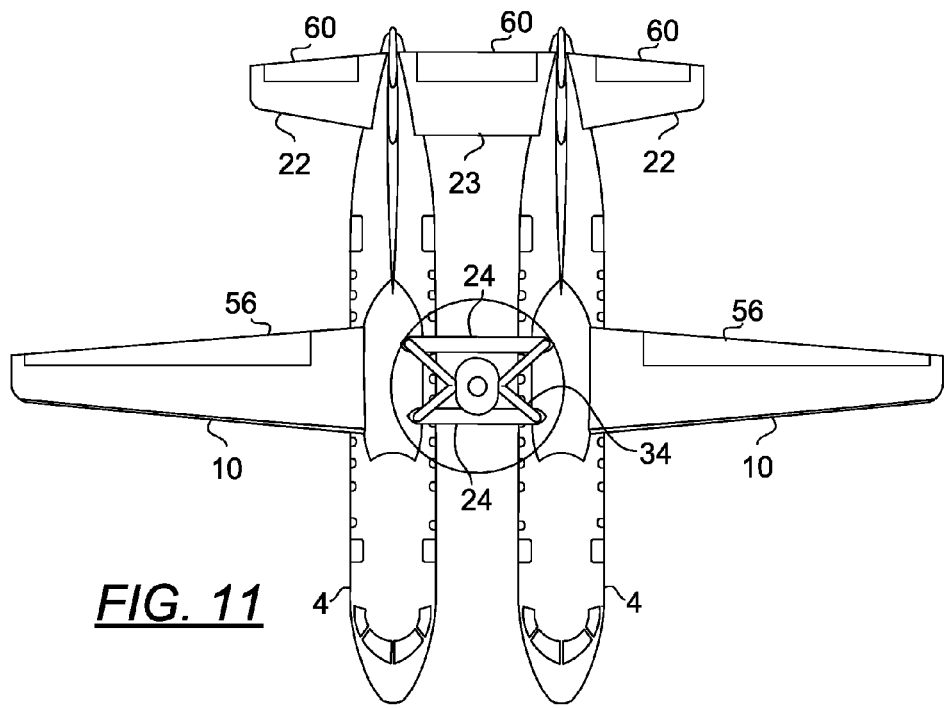

FIGS. 10 and 11 are front and top orthogonal views, respectively, of an embodiment of the present aircraft, depicting the engine pod disposed in an orientation for vertical take-off or landing.

Figure 12:
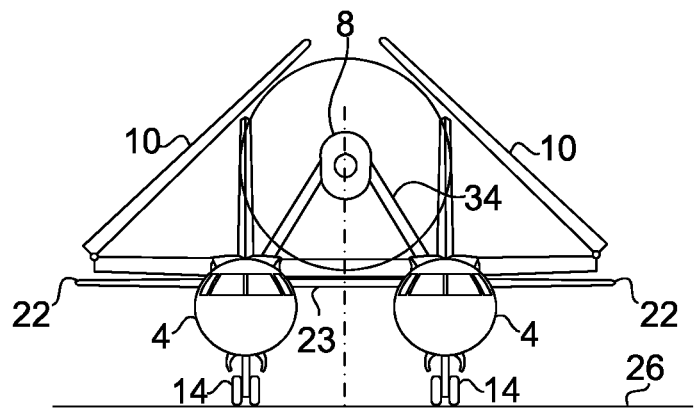
FIG. 12 is a front orthogonal view of an embodiment of the present aircraft, depicting the wings in a folded configuration for compact stowage of the aircraft.

FIG. 12 is a front orthogonal view of an embodiment of the present aircraft, depicting the wings in a folded configuration for compact stowage of the aircraft. It can be seen that the wings 10 are folded upwardly toward one another at approximately to result in a laterally more compact aircraft. Any interlocking mechanisms for securing the wings 10 in flight ready or folded conditions are well known to those skilled in the art.

Figure 14:
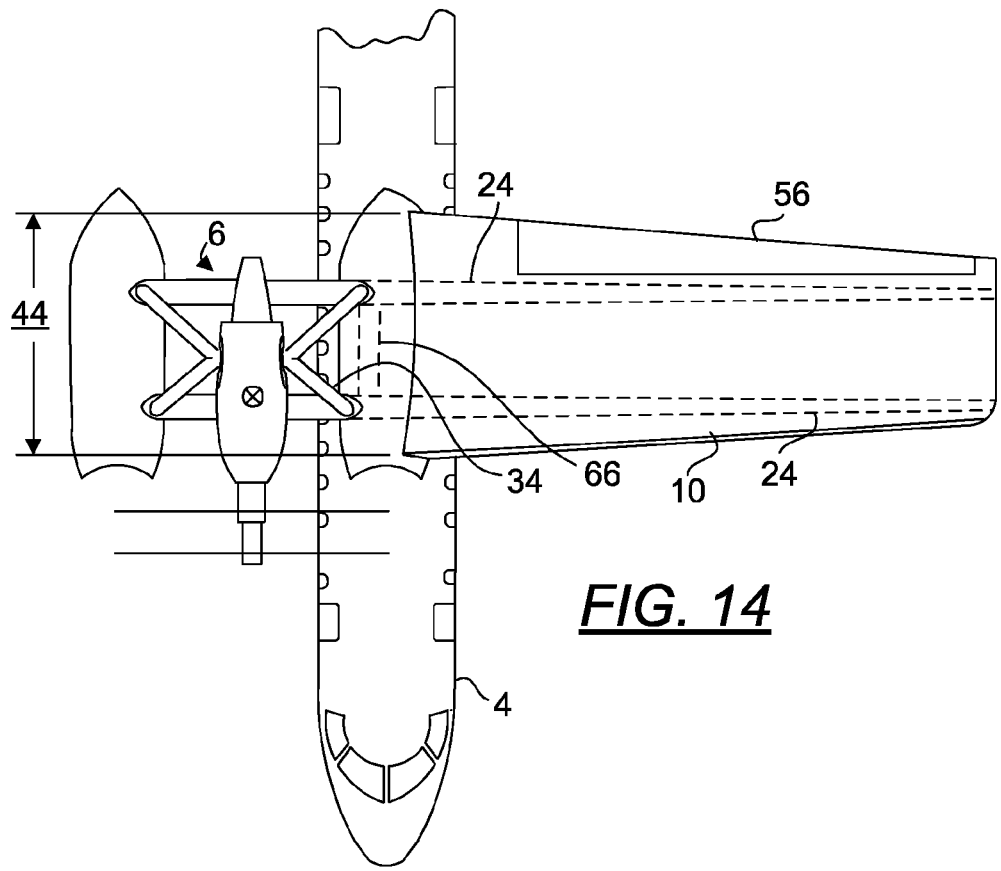
FIG. 14 is a partial transparent top orthogonal view of an embodiment of the present aircraft, depicting another spar configuration within a wing of the present aircraft.

FIG. 13 is a partial transparent top orthogonal view of an embodiment of the present aircraft, depicting a typical spar configuration within a wing of the present aircraft. It can be seen that the spars 24 extend within the wing 10 from the pyramid structure to the wingtip. An internally disposed strut 66 connects the spars 24 to further strengthen the connection of the wing 10 to the fuselage 4 and the connection of the pyramid structure to a fuselage 4. FIG. 14 is a partial transparent top orthogonal view of an embodiment of the present aircraft, depicting another spar configuration within a wing of the present aircraft. It can be seen that the spars 24 are spaced more narrowly with respect to the width 44 of a wing 10, thereby enabling straight spars 24 extending from a wingtip to another.

Figure 15:
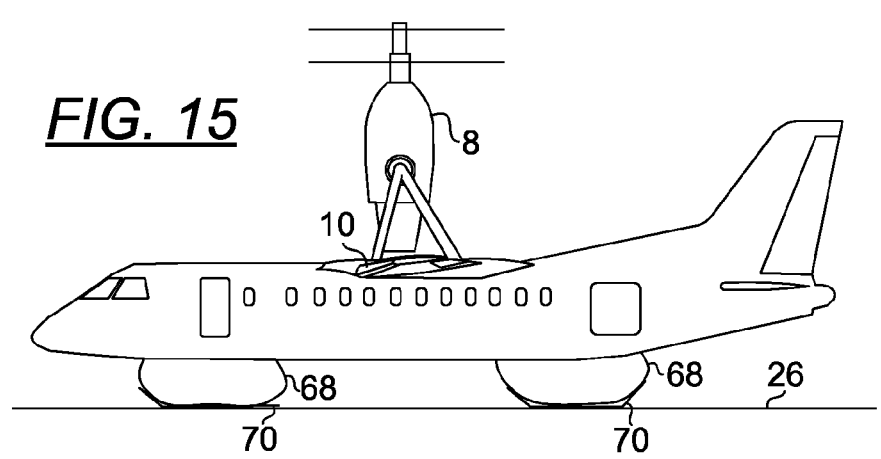
FIG. 15 is a side orthogonal view of an embodiment of the present aircraft, depicting the use of airbag on exterior surfaces of a fuselage.

FIG. 15 is a side orthogonal view of an embodiment of the present aircraft, depicting the use of airbags 68 on exterior surfaces of a fuselage 4. In this embodiment, two airbags 68, one mounted towards the nose of a fuselage 4 and another towards the aft of the fuselage 4, are used to cushion the impact of the present aircraft with the ground 26 during emergency landing due to failure of landing gear 14 to deploy, partial or total loss of engine power, etc. Each undeployed airbag 68 is typically mounted in a module configured to be mounted to the underside of a fuselage 4. Various triggers such as a particular aircraft elevation, an impact sensor activation or a manual switch selection may be used to deploy such airbags. Upon activation, a protective skin structure 70 of an airbag module which is typically mounted flush with the underside of a fuselage 4, detaches from the underside of the fuselage 4, allowing an airbag 68 to protrude from the underside of the fuselage 4. The protective skin structure 70 is preferably still attached to the airbag 68 upon its deployment to prevent puncturing of the airbags by ground objects upon impact. The construction and use of an airbag 68 is well known to those skilled in the art.

Apart from the stability achieved by centering the thrust axis between the two fuselages, static imbalance along the roll axis is maintained by actively distributing fuel between the two fuselages to maintain the center of gravity about the longitudinal axis, while pitch stability is achieved by distributing fuel fore and aft such that the center of gravity is maintained in the longitudinal direction.

During operation with vertical take-off and landing, the articulated propulsion system is oriented as shown in FIG. 7. Upon gaining height and reaching desired heading, the articulated system is oriented as shown in FIG. 6 before reaching the orientation as shown in FIG. 5. The landing gear 14 may be retracted into a fuselage 4 when appropriate height has been reached or when landing is not imminently expected.

The present aircraft may be used in a variety of applications including point-to-point air taxi serving rural communities that cannot be served by conventional aircraft which require runways, thereby opening up remote areas without airports to air traffic. By using the roof of a building to take-off or land, the present aircraft can extend its service to dense urban settings and bridge the gap between remote and urban areas. The present aircraft can use unprepared surfaces when necessary, such as for ambulatory services or to provide disaster relief to stricken areas. Another advantage crucial to both civilian and military applications lies in the availability of two outboard sides of the fuselages that are free from hazards of the propulsion system to facilitate entry to and egress from the fuselages. In addition, the present aircraft can be readily converted into a gunship where guns can be mounted and fired from the outboard side as well as the nose of each fuselage. In combat situations, engines and propellers are shielded from hostile fire by fuselages from each side. Bullet trajectories of bullets emanating from the aircraft are unaffected because of the absence of propeller downwash along the outboard sides of the fuselages. Hard-points may be provided under wings or on wing tips to carry weapons. In contrast, due to the location of the propellers in V-22, soldiers must enter and exit the aircraft only from the rear of the aircraft. Gun fire from the outboard sides must also be avoided for the same reason. As a consequence, V-22 can at best be used only to transport troops. More recently, some V-22s have been equipped with guns limited to the belly of the aircraft.

In one embodiment of the present aircraft, airbags are disposed on bottom surfaces of the fuselages and configured to deploy in case of catastrophic engine failure while hovering to cushion the landing of the disabled aircraft.

In contrast to rotating wing aircraft, the present aircraft can fly at high speeds over long distances, and with much lower fuel consumption since lift is provided by fixed wings rather than rotating wings. This feature is especially attractive to commercial service.

In yet another embodiment, the present aircraft may also be constructed as an unmanned scaled and/or miniature model for hobby aircraft, remote observations, reconnaissance and monitoring uninhabited areas.

I claim:

1. An aircraft comprising:
   (a) a pair of spaced apart and parallelly disposed elongated fuselages forming a gap, wherein said pair of fuselages each comprise a longitudinal axis;
   (b) a pair of wings, each wing is attached to an outboard side of each said fuselage;
   (c) a pyramid truss structure adapted to connect said pair of fuselages; and
   (d) an articulated propulsion system having a thrust axis, wherein said articulated propulsion system is pivotably attached to said pyramid structure and configured for angle of rotation of from substantially 0 degrees, corresponding to said thrust axis disposed substantially parallel but at a vertical offset to said longitudinal axis and above the fuselages, to substantially 90 degrees corresponding to said thrust axis disposed substantially at right angle to said longitudinal axis,
   wherein said thrust axis substantially intersects a center of gravity of said aircraft when said thrust axis is disposed substantially at right angle to said longitudinal axis and said propulsion system is capable of an angle of rotation ranging from about 0 degrees to about 90 degrees during take-off or landing.

2. The aircraft of claim 1, wherein said articulated propulsion system is a counter-rotating co-axial propeller system.

3. The aircraft of claim 1, wherein said articulated propulsion system is a counter-rotating co-axial propeller system connected to two engines.

4. The aircraft of claim 2, wherein said counter-rotating co-axial propeller system comprises a means for cyclical control.

5. The aircraft of claim 1, wherein the ratio of said offset to said gap ranges from about $1/3$ to about $5/6$.

6. The aircraft of claim 1, wherein each fuselage comprises at least one passenger access door on the outboard side of each fuselage.

7. The aircraft of claim 1, wherein said pyramid structure comprises more than one spar connecting said pair of fuselages.

8. The aircraft of claim 1, further comprising at least one airbag configured to be mountable on an exterior surface of one of said pair of fuselages, wherein said at least one airbag is configured to provide cushioning of said aircraft with an exterior object.

9. An aircraft comprising:
   (a) a pair of spaced apart and parallelly disposed elongated fuselages forming a gap, wherein said pair of fuselages each comprise a longitudinal axis;
   (b) a pair of wings, each wing is attached to an outboard side of each said fuselage;
   (c) a pyramid truss structure adapted to connect said pair of fuselages; and
   (d) a counter-rotating co-axial propeller system having a thrust axis, wherein said propeller system is pivotably attached to said pyramid structure and configured for angle of rotation of from substantially 0 degrees, corresponding to said thrust axis disposed substantially parallel but at a vertical offset to said longitudinal axis and above the fuselages, to substantially 90 degrees corresponding to said thrust axis disposed substantially at right angle to said longitudinal axis,
   wherein said thrust axis substantially intersects a center of gravity of said aircraft when said thrust axis is disposed substantially at right angle to said longitudinal axis and said propulsion system is capable of an angle of rotation ranging from about 0 degrees to about 90 degrees during take-off or landing.

10. The aircraft of claim 9, wherein said counter-rotating co-axial propeller system is connected to two engines.

11. The aircraft of claim 10, wherein said counter-rotating co-axial propeller system comprises a means for cyclical control.

12. The aircraft of claim 9, wherein the ratio of said offset to said gap ranges from about $1/3$ to about $5/6$.

13. The aircraft of claim 9, wherein each fuselage comprises at least one passenger access door on the outboard side of each fuselage.

14. The aircraft of claim 9, wherein said pyramid structure comprises more than one spar connecting said pair of fuselages.

15. The aircraft of claim 9, further comprising at least one airbag configured to be mountable on an exterior surface of one of said pair of fuselages, wherein said at least one airbag is configured to provide cushioning of said aircraft with an exterior object.

16. An aircraft comprising:
   (a) a pair of spaced apart and parallelly disposed elongated fuselages forming a gap, wherein said pair of fuselages each comprise a longitudinal axis;
   (b) a pair of wings, each wing is attached to an outer portion to said each of said pair of fuselages;
   (c) a pyramid truss structure adapted to connect said pair of fuselages; and
   (d) a counter-rotating co-axial propeller system having a thrust axis and comprising a means for cyclical control, wherein said thruster is pivotably attached to said structure and configured for angle of rotation of from substantially 0 degrees, corresponding to said thrust axis disposed substantially parallel but at a vertical offset to said longitudinal axis and above the fuselages, to substantially 90 degrees corresponding to said thrust axis disposed substantially at right angle to said longitudinal axis, wherein said thrust axis substantially intersects a center of gravity of said aircraft when said thrust axis is disposed substantially at right angle to said longitudinal axis and said propulsion system is capable of an angle of rotation ranging from about 0 degrees to about 90 degrees during take-off or landing and said means for cyclical control enables fine position control of the aircraft during vertical flight.

17. The aircraft of claim 16, wherein said counter-rotating co-axial propeller system is connected to two engines.

18. The aircraft of claim 16, wherein the ratio of said offset to said gap ranges from about ⅓ to about ⅚.

19. The aircraft of claim 16, wherein each fuselage comprises at least one passenger access door on the outboard side of each fuselage.

20. The aircraft of claim 16, wherein said pyramid structure comprises more than one spar connecting said pair of fuselages.

\* \* \* \* \*